(No Model.)
J. C. SHEPHERD.
ROAD CART.
No. 496,912.  Patented May 9, 1893.
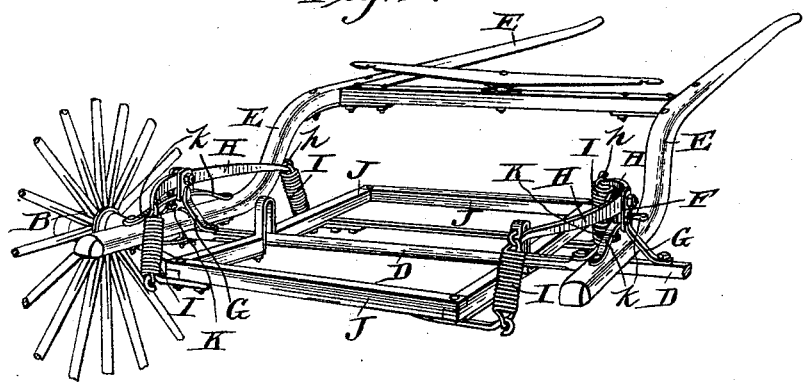
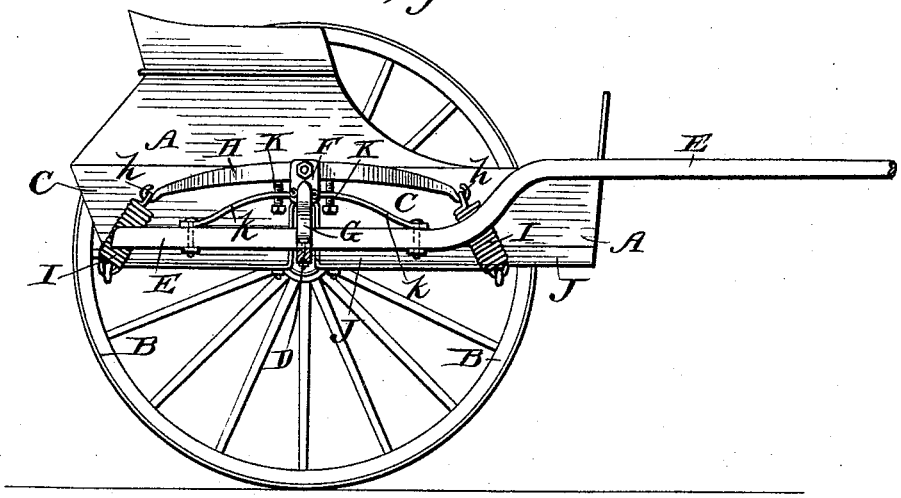
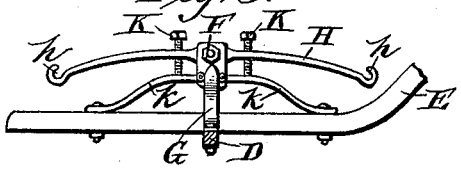

UNITED STATES PATENT OFFICE.

JOHN C. SHEPHERD, OF TILSONBURG, CANADA.

ROAD-CART.

SPECIFICATION forming part of Letters Patent No. 496,912, dated May 9, 1893.

Application filed January 23, 1893. Serial No. 459,343. (No model.)

*To all whom it may concern:*

Be it known that I, JOHN C. SHEPHERD, a subject of the Queen of Great Britain, residing at Tilsonburg, in the county of Oxford and Province of Ontario, Canada, have invented certain new and useful Improvements in Road-Carts; and I do hereby declare the following to be a full, clear, and exact description of the invention, such as will enable others skilled in the art to which it appertains to make and use the same.

My invention relates to road carts and consists in four coiled springs arranged at approximately the four corners of the body of the cart in front and rear of the axle and connected at their lower ends to the supporting and attaching frame of the cart, and at their upper ends by longitudinally arranged suspending bars; and it consists secondly in the four coiled springs set diagonally at approximately the four corners of the body of the cart in front and in rear of the axle and connected at their lower ends to the supporting and attaching frame of the cart and at their upper ends by vertically adjustable, longitudinally arranged, suspending bars, as will be hereinafter described.

Figure 1 is a perspective view of a portion of my improved cart, some of the parts being omitted and others broken away to better show the novel features. Fig. 2 is a vertical section of the cart just to one side of the supporting beam, springs and one shaft, and Fig. 3 is a detail view of the suspending beam attached to a shaft and adjusting screws passed through the suspending beam from the top instead of from the bottom as in Fig. 2.

A in the drawings represents my improved road cart which is provided with two side wheels B B, body C, an axle D arranged about centrally of the length of the body, and shafts E, which latter extend preferably to the rear end of the cart. Vertical supports F are secured to the axle on opposite sides of the cart by braces G in the upper ends of which suspending bars H are pivoted so as to have an articulating movement when desired as clearly shown in Fig. 2. These bars are provided with hooked ends *h* to which coiled springs I are attached. The springs are arranged diagonally with respect to the body of the cart and are secured at their lower ends to extensions on the sides of the cart frame J. By arranging and locating the springs in the manner described and shown the motion given to the springs by the horse will be neutralized and no horse motion will be imparted to the body of the cart. By having the suspending bars H pivoted in the vertical supports F permits the same to have an articulating movement and accommodate themselves to the movements of the springs.

K represents adjusting screws which are passed through elliptical braces *k* bolted to the shafts and bear with their screw ends against the suspending bars H on opposite sides of their pivots, as shown in Fig. 2. In Fig. 3 the arrangement of the adjusting screws are reversed, the screws in this instance passing through the suspending bars and bearing with their screw ends against the top surfaces of the braces *k*, but in either case the manipulation of the adjusting screws will be the same. By means of these screws the springs I can be regulated to suit horses of different sizes by loosening one of the screws and tightening the other. For instance, if it is desired to adjust the springs to a large horse so as to have the body of the cart set level the forward springs would be loosened or lowered the desired extent and the rear screws tightened or raised and the springs I held in the desired position. The body of the cart is cut away in the line of the axle to receive the axle when the cart body is pressed down by the weight of an occupant of the seat.

By my novel arrangement and construction of parts a very simple, light, cheap and durable cart is produced which is easy of manipulation and free from all horse motion and adapted for use with horses of different sizes.

What I claim as my invention is—

1. In a road cart, the combination of vertical supports arranged about centrally of the length of the cart and secured to the axle, longitudinal suspending bars pivoted to said supports and secured at their outer ends to coiled springs in front and rear of the axle at the sides of the cart, whereby the bars are adapted to be turned on their pivots, substantially as described.

2. In a road cart, the combination of vertical supports arranged about centrally of the length of the cart and secured to the axle, longitudinal suspending bars pivoted to said supports and secured at their outer ends to coiled springs in front and rear of the axle at the sides of the cart and coiled springs arranged diagonally to the body of the cart in front and rear of the axles at points near the four corners of the body, whereby the bars can be turned on their pivots, substantially as described.

3. In a road cart, the combination of vertical supports arranged about centrally of the length of the cart, longitudinal suspending bars pivoted to said supports and secured at their outer ends to coiled springs arranged diagonally in front and rear of the axle at points near the four corners of the body of the cart, and adjusting means in front and rear of the pivot of the suspending bars for adjusting the springs to different sized horses, substantially as described.

In testimony whereof I hereunto affix my signature in presence of two witnesses.

JOHN C. SHEPHERD.

Witnesses:
A. VAN BUSKIRK,
MARY A. GARNETT.